United States Patent
Koehne

(10) Patent No.: US 12,437,896 B2
(45) Date of Patent: Oct. 7, 2025

(54) METHOD FOR PRODUCING AN ELECTRICALLY CONDUCTIVE CARBON CONDUCTOR WITH CARBON STRUCTURAL FORMS

(71) Applicant: Robert Bosch GmbH, Stuttgart (DE)

(72) Inventor: Martin Koehne, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 210 days.

(21) Appl. No.: 18/257,021

(22) PCT Filed: Dec. 2, 2021

(86) PCT No.: PCT/EP2021/083898
§ 371 (c)(1),
(2) Date: Jun. 12, 2023

(87) PCT Pub. No.: WO2022/128497
PCT Pub. Date: Jun. 23, 2022

(65) Prior Publication Data
US 2024/0120127 A1  Apr. 11, 2024

(30) Foreign Application Priority Data
Dec. 15, 2020 (DE) ............. 10 2020 215 963.7
Mar. 11, 2021 (DE) ............. 10 2021 202 367.3

(51) Int. Cl.
*H01B 1/04* (2006.01)
*H01B 13/00* (2006.01)

(52) U.S. Cl.
CPC ........... *H01B 1/04* (2013.01); *H01B 13/0016* (2013.01)

(58) Field of Classification Search
CPC ....................................................... H01B 1/04
See application file for complete search history.

(56) References Cited

U.S. PATENT DOCUMENTS

| | | | | |
|---|---|---|---|---|
| 4,477,374 A | * | 10/1984 | Watanabe | H01B 1/06 423/439 |
| 9,306,096 B2 | | 4/2016 | Balaganesan et al. | |
| 2010/0206363 A1 | * | 8/2010 | Choi | C01B 32/182 428/408 |
| 2013/0180581 A1 | | 7/2013 | Choi | |
| 2014/0087164 A1 | | 3/2014 | LeMieux et al. | |
| 2015/0093572 A1 | * | 4/2015 | Zhou | D01F 9/12 428/367 |
| 2016/0019995 A1 | * | 1/2016 | Zhamu | C01B 32/182 427/122 |
| 2018/0212247 A1 | * | 7/2018 | Zhamu | H01M 4/0497 |

FOREIGN PATENT DOCUMENTS

| | | |
|---|---|---|
| CN | 106744888 A | 5/2017 |
| DE | 2537272 A1 | 3/1976 |
| DE | 2946414 A1 * | 5/1981 |
| EP | 0081004 A1 | 6/1983 |
| KR | 20100078444 A * | 7/2010 |

OTHER PUBLICATIONS

Lee et al. KR20100078444A Translation. 2010 (Year: 2010).*
Translation of International Search Report for Application No. PCT/EP2021/083898 dated Mar. 18, 2022 (3 pages).

* cited by examiner

*Primary Examiner* — Cachet I Proctor
(74) *Attorney, Agent, or Firm* — Michael Best & Friedrich LLP

(57) ABSTRACT

The present invention relates to a method for producing an electrical carbon conductor from carbon structural forms, which are in particular allotropic modifications of the carbon, in particular graphite, pyrolytic graphite, graphene and/or carbon nanotubes, and precursor compounds of graphene, such as graphene oxide, for example, which, in order to increase the electrical conductivity of the electrical carbon conductor, are doped with an additive for doping the carbon structural forms, in particular aluminum fluoride and/or aluminum chlorofluoride and/or perfluorinated polymeric sulfonic acid, characterized by the steps: producing a liquid dispersion from undoped carbon structural forms and a solvent, adding the additive to the dispersion and mixing the dispersion, producing a conductor strand in fiber or film form to form the carbon conductor, in particular by wet-spinning the dispersion or by depositing the dispersion on a carrier material, and by removing the dispersion fluid from the conductor strand as a liquid phase, which is achieved in particular by drying, vacuum and heat treatment.

5 Claims, No Drawings

METHOD FOR PRODUCING AN ELECTRICALLY CONDUCTIVE CARBON CONDUCTOR WITH CARBON STRUCTURAL FORMS

BACKGROUND

The present invention relates to a method for producing an electrically conductive carbon conductor. The carbon conductor comprises at least one carbon structural form which is an allotropic modification of the carbon. The carbon conductor is provided with further compounds in order to increase its electrical conductivity.

Carbon conductors are known in the prior art. For example, the prior art knows electrical conductors made of graphite, pyrolytic graphite, carbon nanotubes, or graphene. In order to increase its electrical conductivity, it is known to dope the carbon conductor.

From CN106744888A, it is known to produce graphene in a graphene dispersion by adding aluminum fluoride and amines.

It is known from U.S. Pat. No. 9,306,096 B1 that the electrical conductivity of perfluorinated sulfonic acid polymer Nafion-H can be increased by low additions of carbon nanotubes (approx. 0.1 mass %).

SUMMARY

The method according to the invention allows for the doping of carbon conductors, in particular with fluorides. In so doing, the invention avoids the use of chlorine or fluorine as excipients for doping, whereby adverse reactions with the carbon conductor are avoided. Because a fluorination of the carbon conductor would lead to a significant degradation of the electrical conductivity, the electrical conductivity is thus improved. In addition, the doping according to the invention has a high temperature stability and a resistance to humidity. At the same time, the electrical conductivity of the carbon conductor is improved.

The method according to the invention serves to produce an electrical carbon conductor from carbon structural forms in the sense of allotropic modifications of the carbon, in particular graphite, pyrolytic graphite, graphene, and/or carbon nanotubes, as well as precursor compounds of graphene such as e.g. graphene oxide. The carbon structural forms are doped with an additive in order to increase the electrical conductivity of the electrical carbon conductor. The additive is in particular aluminum fluoride and/or aluminum chlorofluoride and/or perfluorinated polymeric sulfonic acid.

First, a liquid dispersion is produced. The dispersion comprises on one hand the carbon structural forms and on the other hand a solvent. In addition, an additive is mixed into the dispersion. The components thus gathered together are thoroughly mixed.

Thereafter, a conductor strand in fiber or film form for forming the carbon conductor is produced. This is preferably done by wet-spinning the dispersion or by depositing the dispersion on a carrier material. In addition, the dispersion fluid is removed from the conductor strand without generating gas or vapor bubbles by diffusion from the liquid phase, which is achieved in particular by drying, vacuum, and heat treatment. The additive remains in the conductor and in particular leads to the aforementioned doping. Thus, the electrical conductivity of the carbon conductor can be easily and reliably increased.

Advantageously, the additive is aluminum fluoride and/or aluminum chlorofluoride. These substances allow for an effective doping. In order to suppress a crystallization of these additives, an additional crystallization inhibitor is added to the dispersion. The crystallization inhibitor is in particular chelating agents with polycyclic aromatic carbon groups. Alternatively or additionally, surfactants are used as crystallization inhibitors, in particular nonionic surfactants having hydrophilic groups, anionic surfactants having hydrophilic groups, or amphoteric surfactants having hydrophilic groups. By the crystallization inhibitors, a molecular distribution of the aluminum fluoride and/or aluminum chlorofluoride into the molecular interstices of the carbon structural forms can advantageously be achieved. This monomolecular distribution causes the additives to become stronger Lewis acids compared to the non-monomolecular distribution.

The produced conductor strand is particularly advantageously heat-treated. With the heat treatment, a thermal decomposition of the crystallization inhibitor in the material of the conductor strand is achieved. Alternatively or additionally, the heat treatment removes oxygen atoms from the material of the conductor strand. Thus, it is achieved that no or nearly no impurities remain in the finished carbon conductor. The crystallization inhibitor is only required during the production of the conductor strand, so that the additive does not crystallize. Subsequently, the crystallization inhibitor can be removed, wherein the amorphously present additive ensures a high electrical conductivity of the carbon conductor.

In a further particularly preferred configuration, the admixture of aluminum fluoride and/or aluminum chlorofluoride is carried out such that the conductor strand comprises at least 80 vol. % of the carbon structural forms and at most 20 vol. % aluminum fluoride and/or aluminum chlorofluoride. In particular, the content of aluminum fluoride and/or aluminum chlorofluoride is at most 10 vol. %.

The aluminum chlorofluoride preferably has the molecular formula $AlCl_xF_{3-x}$ where $0.005 \leq x \leq 0.01$. This minimizes the amount of chlorine. This leads to a lower sensitivity to the presence of Lewis bases, such as humidity, which reduce the acid strength of the aluminum chlorofluoride by reaction with the chlorine. Because only the chlorine in aluminum chlorofluoride is sensitive to such Lewis bases, aluminum chlorofluorides with as little chlorine as possible are advantageous.

In a further configuration, the additive is a precursor compound of aluminum fluoride. This precursor compound can be partially decomposed into aluminum fluoride by heat. Thus, aluminum fluoride is again used for doping, but the aluminum fluoride does not have to be introduced directly into the dispersion for producing the conductor strand. Rather, precursor compounds of aluminum fluoride are used that allow for easier handling and thus simplify the producing process. Such precursor compounds of aluminum fluoride are, in particular, aluminum trifluoroacetate and/or aluminum difluoroacetate and/or fluorinated aluminum alcoholates, in particular aluminum trifluoroethanolate and/or triammonium hexafluoroaluminate and/or aluminum hydroxide fluoride, in particular wherein the aluminum hydroxide fluoride has the molecular formula $AlF_x(OH)_{3-x}$ where $x=2$. If such precursor compounds of aluminum fluoride are used, conversion of the precursor compounds into aluminum fluoride can occur after production of the conductor strand in order to achieve an optimum doping of the conductor strand.

The heat treatment of the produced conductor strand is particularly advantageous. By heat-treating the conductor strand, the precursor compound of aluminum fluoride in the material of the conductor strand is thermally decomposed. This decomposition leads to the production of the aluminum fluoride in situ in the conductor strand and thus to the doping of the conductor strand. Alternatively or additionally, the heat treatment removes oxygen atoms from the material of the conductor strand.

Preferably, it is also contemplated that the additive is perfluorinated polymeric sulfonic acid, wherein the carbon structural forms only comprise graphite, pyrolytic graphite, and/or graphene, and/or carbon nanotubes. Perfluorinated polymeric sulfonic acids are non-volatile, temperature stable to over 200° C., and resistant to humidity. In addition, perfluorinated polymeric sulfonic acids can be dissolved in water and can thereby be incorporated into an e.g. aqueous dispersion of graphite, pyrolytic graphite, graphene, or carbon nanotubes in order to molecularly distribute them on the surface of the nanocarbon. In addition, because perfluorinated polymeric sulfonic acids are strong Lewis acids, optimal properties as a dopant are also given, because a high electrical conductivity is achieved in the conductor strand.

Particularly preferably, the perfluorinated polymeric sulfonic acid has the following structure, where $x<1$, $y<3$, $m<7$ and $n<1000$:

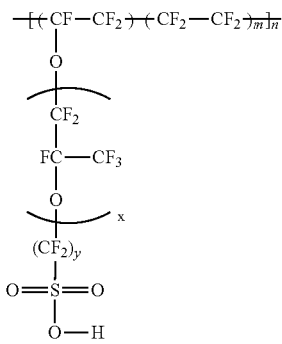

Such perfluorinated polymeric sulfonic acids can be optimally used in the production process and lead to a high electrical conductivity of the finished carbon conductor. At the same time, they are temperature-stable and moisture-resistant.

The addition of the perfluorinated polymeric sulfonic acid is carried out in particular such that the conductor strand comprises at least 85 vol. % of the carbon structural forms and at most 15 vol. % perfluorinated polymeric sulfonic acid. Preferably, the proportion of perfluorinated polymeric sulfonic acid is limited to at most 10 vol. %.

The amorphous aluminum fluoride and/or the aluminum chlorofluoride and/or the perfluorinated polymeric sulfonic acid are preferably evenly distributed in the conductor strand. Thus, these additives are in particular amorphous. This leads to a high strength as a Lewis acid and thus optimal doping. Thus, high electrical conductivity of the carbon conductors is achievable.

DETAILED DESCRIPTION

Preferably, the electrical conductivity of carbon conductors based on graphite, pyrolytic graphite, graphene, or carbon nanotubes is increased by the extrinsic doping. The doping is temperature-stable and humidity-resistant.

The carbon conductor is made by first producing a liquid dispersion of, in particular undoped, carbon structural forms, a solvent, and other substances for improving dispersibility. The undoped carbon structural forms are in particular graphite, pyrolytic graphite, graphene, or carbon nanotubes as well as their precursor compounds of graphene, such as graphene oxide. To increase the electrical conductivity of the electrical carbon conductor, a doping is carried out with an additive, wherein the additive is added to the dispersion, and the dispersion is mixed.

Finally, a conductor strand in fiber or film form is produced to form the carbon conductor. For this purpose, for example, the dispersion is wet-spun, or the dispersion is deposited onto a carrier material. In addition, the dispersion fluid is removed from the conductor strand by diffusion, which is achieved in particular by drying, vacuum, and heat treatment.

Various additives can be used in order to produce the doping, as explained below:

Use of Precursor Compounds of Aluminum Fluoride ($AlF_3$)

In one embodiment, the use of precursor compounds of aluminum fluoride for the production of amorphous aluminum fluoride ($AlF_3$) is provided in situ in the conductor strand. The production of $AlF_3$ is done by thermolysis. Thus, suitable precursor compounds to $AlF_3$ decompose without melting or forming a liquid phase. The amorphous $AlF_3$ formed in this case causes a strong extrinsic doping of the graphite, pyrolytic graphite, or the carbon nanotubes, and thereby improves the electrical conductivity by at least one magnitude. The high strength of amorphous $AlF_3$ as a Lewis acid provides electrical conductivity up to 90 MS/m.

As an additive, the aforementioned precursor compounds of $AlF_3$ are thus added to the dispersion. Aluminum trifluoroacetate, aluminum difluoroacetate, fluorinated aluminum alcoholates such as in particular aluminum trifluoroethanolate, triammonium hexafluoroaluminate, and aluminum hydroxide $AlF_x(OH)_{3-x}$ in particular are provided as precursor compounds for amorphous $AlF_3$ where $x=2$. These are thus dissolved in the solvent in which graphene or graphene oxide can also be dispersed. A suitable solvent is, for example, dimethylformamide.

After production of the conductor strand, in that, in addition to the undoped carbon structural forms, at least a part of the precursor compounds of $AlF_3$ also remains, a heat treatment is carried out in order to decompose the precursor compounds into $AlF_3$. By using such precursor compounds of $AlF_3$, clusters of the precursor compounds of $AlF_3$ that can have already arisen are destroyed through their thermolysis. In particular, this achieves an approximately molecular distribution on the graphite, pyrolytic graphite, graphene, or the carbon nanotubes. This leads to a greater doping effect and thus a high electrical conductivity of the conductor strand.

The aluminum fluorides formed from the precursor compounds are in particular predominantly amorphous. This can be achieved when the precursor compounds of $AlF_3$ are distributed approximately molecularly on the surface of the graphite, pyrolytic graphite, graphene, or the carbon nanotubes. This is achieved in particular by eliminating $AlF_3$ dissolved in a solvent, because $AlF_3$ has a strong propensity for crystallization and thus the formation of amorphous $AlF_3$ from the solvent is made more difficult. The formation of nanoparticles prior to thermolysis can be tolerated, because, in thermolysis, the particles disintegrate into even smaller particles by the resulting gases.

The carbon conductor preferably consists of at least 80 vol. % graphite, pyrolytic graphite, graphene, or carbon nanotubes, i.e., the conductor strand, and at most 20 vol. % amorphous aluminum fluoride, i.e., the additive. It is particularly advantageous when the amount of amorphous aluminum fluoride is limited to at most 50%.

Use of Aluminum Fluoride ($AlF_3$) and a Crystallization Inhibitor

In a further embodiment, the use of aluminum fluoride ($AlF_3$) or aluminum chlorofluoride ($AlF_{3-x}Cl_x$) for extrinsic doping of the conductor strand on the basis of graphite, pyrolytic graphite, graphene, or carbon nanotubes is provided. Due to the high strength of monomolecular $AlF_3$ or $AlF_{3-x}Cl_x$ as a Lewis acid, an optimal doping and thus a high electrical conductivity of the carbon conductor is achievable.

To adjust the crystallization of $AlF_3$ or $AlF_{3-x}Cl_x$, the use of a crystallization inhibitor is to be suppressed or at least reduced. A monomolecular distribution of $AlF_3$ or $AlF_{3-x}Cl_x$ on the graphene or the carbon nanotubes can be achieved.

The $AlF_3$ or $AlF_{3-x}Cl_x$ is preferably dissolved in the solvent in which the undoped carbon structural forms are or can be dispersed. The solvent has a solubility for the two fluorides mentioned. After formation of the conductor as previously described, at least a portion of the fluoride remains as a strong Lewis acid.

Because the chlorine in aluminum chlorofluoride is very sensitive to Lewis bases and thus also to moisture, the parameter x of between 0.005 and 0.01 is preferably selected in the molecular formula $AlCl_xF_{3-x}$ so that only a small proportion of chlorine is present.

In order for the fluorides mentioned to be predominantly amorphous so as to achieve their high strength as a Lewis acid, the tendency of the fluorides in an aqueous solution to form crystals is preferably suppressed by crystallization inhibitors, which attach to the fluorides and sterically inhibit a crystallization. It is thus achieved that the fluorides are predominantly amorphous in combination with the material of the conductor strand, and particularly preferably monomolecular. Such crystallization inhibitors are, in particular: surfactants or chelating agents. In particular, those with polycyclic aromatic carbon groups are used as chelating agents.

The following are preferably used as surfactants:
nonionic surfactants with hydrophilic groups, e.g.
—OH, i.e., multiple alcohols,
—O—, i.e., ether, or
the combination —O—$CH_2$—$CH_2$—OH, e.g. ethoxylates,
anionic surfactants with hydrophilic groups such as e.g.
—$COO^-$, i.e., carboxylates,
—$SO_3^-$, i.e., sulfonates, or
—$OSO_3^-$, i.e., sulfates, or
Amphoteric surfactants, i.e., zwitterionic surfactants, with hydrophilic groups such as —$COO^-$, i.e., carboxylates, and $R_4N^+$, i.e., quaternary ammonium groups.

The hydrophobic part of particularly suitable surfactants contains polycyclic aromatic carbon groups such as phenyl, naphthalene, or anthracene. These groups have a high affinity for, and accordingly attach to, the graphite, pyrolytic graphite, graphene, and carbon nanotubes due to the structural similarity to graphite, pyrolytic graphite, and carbon nanotubes.

Lastly, the conductor strand is heat-treated. The surfactants or chelating agents used decompose at temperatures of up to 500° C., thereby leaving no inorganic substances except carbon. Thus, there is no impurity. Thus, the highly effective doping using amorphous aluminum chlorofluoride and aluminum fluoride to increase the electrical conductivity of the conductor strand is not impaired.

The carbon conductor preferably consists of at least 80 vol. % graphite, pyrolytic graphite, graphene, and/or carbon nanotubes, i.e., the conductor strand, and at most 20 vol. % aluminum fluoride and/or aluminum chlorofluoride, i.e., the additive. It is particularly advantageous when the content of aluminum fluoride and/or aluminum chlorofluoride is limited to at most 10 vol. %.

Use of Perfluorinated Polymeric Sulfonic Acids (PFSA)

In a further embodiment of the invention, the use of perfluorinated polymeric sulfonic acids (PFSA) for extrinsic doping of the electrical conductor strand based on graphite, pyrolytic graphite, graphene, or carbon nanotubes is provided. PFSA is a high-strength Lewis acid, so that a high electrical conductivity of the conductor strand can be achieved. At the same time, a temperature-stable extrinsic doping is enabled, which is particularly stable even at temperatures above 200° C.

Industrially produced PFSAs have an acidity indicated as pKa in the range −5.5 to −6. In addition, PFSA is non-volatile, temperature-stable to over 200° C., and humidity-resistant. It can be dissolved in water and can thereby be incorporated into an e.g. aqueous dispersion of graphite, pyrolytic graphite, graphene, or carbon nanotubes in order to molecularly distribute them on the surface of the nanocarbon.

Particularly advantageously, PFSAs are used having the following structure, where $x<1$, $y<3$, $m<7$ and $n<1000$:

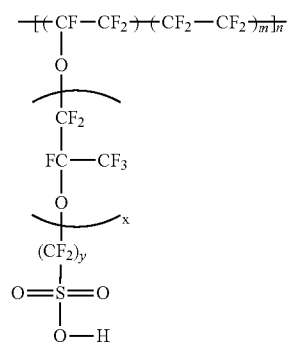

Thus, PFSA is added to the dispersion as an additive. After production of the conductor as previously described, at least a portion of the PFSA remains in the conductor as a strong Lewis acid. The use of PFSA thus allows for a doping to increase an electrical conductivity of the doped conductor strand, wherein the doping is in particular temperature-stable and moisture-stable.

The carbon conductor preferably consists of at least 85 vol. % graphite, pyrolytic graphite, graphene, or carbon nanotubes, i.e., the conductor strand, and at most 15 vol. % a perfluorinated polymeric sulfonic acid, i.e., the additive. Particularly advantageously, the content of perfluorinated polymeric sulfonic acid is limited to at most 10 vol. %.

EXAMPLES

Various examples of the invention are described below.

Example 1

1|Aqueous graphene dispersion with 0.5 mass % graphene, with an average lateral extension of 10 is mixed with 1 ml of a compound containing 25 mass % perfluorinated polymeric sulphonic acid (PFSA) in a container using a stirrer. The mixture is then dispersed by means of an ultrasonic device, so that a homogeneous distribution of the graphene and the PFSA is achieved.

The dispersion is deposited on a filter paper by means of vacuum filtration. After drying, the graphene film is removed from the filter.

Example 2

1|Graphene dispersion with DMF as the dispersion medium (with 0.5 mass % graphene), with an average lateral extension of 10 μm, is mixed with 0.25 g aluminum trifluoroacetate ($C_6AlF_9O_6$) in a container using a stirrer. The mixture is then dispersed by means of an ultrasonic device, so that a homogeneous distribution of the graphene and complete dissolution of the aluminum trifluoroacetate is achieved.

The dispersion is deposited on a filter paper by means of vacuum filtration. After drying, the composite film is removed from the filter. Further thermal actions are carried out under argon in the temperature range of 250° C. to 1270° C.

Example 3

1 |Graphene dispersion with water as the dispersion medium with 0.5 mass % of graphene, with an average lateral extension of 10 pm, is mixed with 0.2 g triammonium hexafluoroaluminate (($NH_4)_3[AlF_6]$) in a container using a stirrer. The mixture is then dispersed by means of an ultrasonic device, so that a homogeneous distribution of the graphene and complete dissolution of the triammonium hexafluoroaluminate is achieved.

The dispersion is deposited on a filter paper by means of vacuum filtration. After drying, the composite film is removed from the filter. Further thermal actions are carried out under argon in the temperature range of 100° C. to 1270° C.

Example 4

1|Aqueous graphene dispersion with 0.5 mass % graphene, with an average lateral extension of 10 pm, is mixed with 0.25 g aluminum fluoride trihydrate ($AlF_3$ $3H_2O$) and 0.25 g of the nonionic surfactant octoxinol 9 in a container using a stirrer. The mixture is then dispersed by means of an ultrasonic device, so that a homogeneous distribution of the graphene and complete dissolution of the aluminum fluoride and surfactant is achieved.

The dispersion is deposited on a filter paper by means of vacuum filtration.

After drying, the composite film is removed from the filter. Further thermal actions are carried out under argon in the temperature range of 250° C. to 1272° C.

The invention claimed is:

1. A method for producing an electrical carbon conductor from carbon structural forms, which, in order to increase the electrical conductivity of the electrical carbon conductor, are doped with an additive for doping the carbon structural forms, comprising the steps:
   producing a liquid dispersion from undoped carbon structural forms and a solvent, wherein the dispersion is additionally mixed with a crystallization inhibitor,
   adding the additive to the dispersion and mixing the dispersion, wherein the additive is aluminum fluoride and/or aluminum chlorofluoride, and
   producing a conductor strand in fiber or film form to form the carbon conductor, by wet-spinning the dispersion or by depositing the dispersion on a carrier material, and by removing the liquid dispersion from the conductor strand as a liquid phase.

2. The method according to claim 1, further comprising the step:
   thermally treating the produced conductor strand, wherein the heat treatment achieves a decomposition of the crystallization inhibitor in the material of the conductor strand and/or a removal of oxygen atoms from the material of the conductor strand.

3. The method according to claim 1, where in the additive of aluminum fluoride and/or aluminum chloride is carried out such that the conductor strand comprises at least 80 vol. % of the carbon structural forms and at most 20 vol. % of aluminum fluoride and/or aluminum chlorofluoride.

4. The method according to claim 1, wherein the aluminum chlorofluoride has the molecular formula $AlCl_xF_{3-x}$ where $0.005<x<0.01$.

5. The method according to claim 1, wherein the aluminum fluoride and/or the aluminum chlorofluoride is evenly distributed in the conductor strand at the molecular level.

* * * * *